United States Patent [19]

Lenz et al.

[11] 3,901,946

[45] Aug. 26, 1975

[54] METHOD FOR THE CONTINUOUS MANUFACTURE OF ORTHOFORMIC ACID ALKYL ESTERS

[75] Inventors: Arnold Lenz, Koln-Stammhein; Otto Ackermann, Troisdorf-Sieglar; Otto Bleh, Troisdorf, Bergheim, all of Germany

[73] Assignee: Dynamit Nobel Aktiengesellschaft, Troisdorf, Germany

[22] Filed: Apr. 18, 1974

[21] Appl. No.: 462,163

Related U.S. Application Data

[63] Continuation of Ser. No. 216,781, Jan. 10, 1972, abandoned.

[30] Foreign Application Priority Data

Jan. 29, 1971 Germany ........................ 2104206

[52] U.S. Cl. ........................ 260/615 A

[51] Int. Cl. ........................ C07 43/32

[58] Field of Search ........................ 260/615 A

[56] References Cited

UNITED STATES PATENTS 3,274,261 6/1966 Lenz et al. ........................ 260/615 A

FOREIGN PATENTS OR APPLICATIONS 919,465 10/1954 Germany ........................ 260/615 A

OTHER PUBLICATIONS

Post et al., J.A.C.S. 55, 3851–3854, 1933.

Organic Synthesis, Collective Vol. I, John Wiley & Sons, New York 1941, 258–261.

*Primary Examiner*—Howard T. Mars

*Attorney, Agent, or Firm*—Burgess, Dinklage & Sprung

[57] ABSTRACT

A method for the preparation of orthoformic acid trialkyl esters is disclosed. The process comprises continuously reacting chloroform and alkali alcoholates under anhydrous conditions at elevated temperatures and pressures.

4 Claims, No Drawings

METHOD FOR THE CONTINUOUS MANUFACTURE OF ORTHOFORMIC ACID ALKYL ESTERS

This is a continuation of application Ser. No. 216,781, filed Jan. 10, 1972 and now abandoned.

BACKGROUND OF THE INVENTION

The present invention relates to a continuous method for the manufacture of orthoformic acid alkyl esters by the reaction of chloroform with alkali alcoholates.

There are already known numerous methods for the manufacture of orthoformic acid alkyl esters. A summary of the preparation methods is in the "Organic Synthesis" Coll. Vol. I, page 253 et seq., "Houben Weyl, Methoden der organischen Chemie," 4th edition, vol. 6, part 3 (1965), pages 300 to 308 and in "Organic Chemistry" vol. 14 (1970), page 2 to 54, (Carboxylic Ortho Acid Derivatives by Robert H. De Wolfe) published by Academic Press, New York-London.

These known methods are discontinuous and have considerable disadvantages in that numerous by-products are formed which appreciably decrease the yield and which make the economical isolation of the pure ortho ester very difficult or impossible. The best yields which are obtained in accordance with the known methods amount, according to the German Pat. No. 919,465, to 87% of impure orthoformic acid trimethyl ester having a boiling range of 95° to 102°C, calculated on the methylate used, and to 65% of impure orthoformic acid triethyl ester (boiling range 135° to 142°C), calculated on the sodium ethylate used.

According to said patent, the poor yields of orthoformic acid ester of the known methods are caused by the low stability of the ortho esters formed under the reaction conditions. Also, he patent states, as a process condition, that the ester formed must be separated from the reaction mixture immediately after the reactants have been brought together.

The competing reactions which occur in the reaction of chloroform with alcoholic solution of alkali alcoholates are described in the above mentioned "Organic Chemistry" vol. 14 (1970), page 12. Aside from the formation of carbon monoxide and alkenes, the side reactions of the intermediately occurring dichlorocarbon in the alcohol alcoholate solution are regarded as the main reason for the moderate yields.

A further disadvantage of the known methods is that the alkali chloride formed in the reaction is dissolved by the addition of water and in this manner separated from the ester; thereby, an additional technical expenditure results.

DESCRIPTION OF THE INVENTION

It has now surprisingly been found that orthoformic acid èsters can be manufactured from chloroform and alkali alcoholate by continuously and simultaneously introducing the two reaction components in approximately stoichiometric amounts into the reaction vessel; carrying out the reaction in the absence of water and, preferably, under complete exclusion of oxygen, at a temperature of from about 40°C to 120°C and a pressure of from about 1 to 8 atmospheres (absolute); continuously withdrawing the reaction products; and, subsequently, separating the alkali chloride from the reaction solution under anhydrous conditions.

With this method, it was surprisingly found that the yields, particularly when making orthoformic acid trimethyl ester, are to a large extent independent of the reaction temperature and the reaction time and are much higher than those in the known discontinuous methods. This indicates that, contrary to the teachings of the art, the ortho esters formed appear stable under the reaction conditions. Thus, it is not necessary to separate them immediately from the reaction mixture.

Longer reaction tubes are particularly suited as reaction vessels, which reaction tubes are appropriately constructed in such a manner that a depositing of the alkali chloride, which is formed in the reaction, is prevented. However, also other reaction vessels with agitators can be used and also several reactors can be connected in series, so that in the first reactor the major amount of the reactants is being reacted, and in the following reactors the reaction is completed, in a particular case at elevated temperature and higher pressure.

When using two or several reactors in series, it is advantageous to react up to 80% of the reactants in the first reactor and to complete the reaction in the following reactors. The separation of the alkali chloride thereby appropriately takes place after the last reactor.

In the working method according to the invention care must be taken to ensure that the two reaction components are mixed together homogeneously as quickly as possible. This can be achieved either through vigorous mixing of the components by using an agitator of high speed having a rate of rotation of about 100 to 1,000 RPM, or by letting the mixture flow through a tube section with a rate of 0.3 to 10 m/sec.

The resulting considerable reaction heat can be withdrawn by exterior cooling as well as by evaporative cooling. The temperature in the reactor is to amount to about 40° to 120°C. In general, it is preferred to maintain the reaction temperatures as high as possible in order to increase the space-time-yields. If temperatures of above the boiling range are employed, an apparatus is needed which can resist moderate pressures. Preferred temperatures are within the range of 60° to 100°C.

Sodium alcoholates and/or potassium alcoholates are preferably used as reactants in the instant invention. They are utilized in solution in the respective alcohol. The concentration of the solution is set in such a manner that under the desired reaction conditions of pressure and temperature an almost saturated solution is present. However, in principle, it is also possible to carry out the reaction according to the invention with an alcoholate solution of a lower concentration of for example 10 wt.% or even lower.

The two reactants are to be brought to reaction in approximately stoichoimetric amounts. Preferably there is a slight excess of chloroform in such an amount that the mol ratio of chloroform:alkali alcoholate is between 1.0:3 and 1.2:3.

The reaction conditions of residence time, temperature, and pressure are advantageously set in such a manner that the alkali chloride formed in the reaction contains up to a maximum of 1% of alkali alcoholate and the solution freed from alkali chloride still contains up to 5% and preferably about 0.5 to 2% of chloroform.

The separation of the various products continuously accumulating in the reaction mixture during tne instant working method can be carried out in a simple manner with actually known methods. In general, the alkali chloride formed is removed by centrifuging or filtration and/or evaporating off of the reaction solution, and subsequently the alcohol is distillatively separated from the ortho ester. This separation can, if desired, also be carried out discontinuously.

Particularly suited for the process according to the invention are apparata made of rustproof steel. The invention is explained on the basis of the following examples, in which all parts represent parts by weight:

EXAMPLE 1

The continuous manufacture of orthoformic acid trimethyl ester was carried out under nitrogen in an apparatus which consisted of two reactors. The first reactor had a content of 20 liters and the second reactor of 30 liters. 1,200 parts of chloroform per hour as well as 5,100 parts/hour of a 32 wt.% sodium methylate solution in methanol were fed into the first reactor. The two reaction components were well mixed and afterwards fed directly into the second reactor. The temperature of the reaction mixture was kept at about 60°C by exterior cooling. The crude reaction product was withdrawn continuously from the second reactor, whereby the liquid content in both reactors was kept constant during the entire duration of the experiment. The sodium chloride was separated continuously by centrifuging from the reaction mixture withdrawn from the second reactor. The solution freed from NaCl was worked up distillatively in the conventional manner. It was possible to withdraw from the column ortho ester (boiling point 102°C) having a purity of 99.8%. This corresponded to a theoretical yield of 97.3 %, calculated on the basis of chloroform, and 97% calculated on the basis of sodium methylate.

EXAMPLE 2

For this experiment, the same apparatus was used as in EXAMPLE 1. 600 parts of chloroform/hour as well as a solution of sodium methylate in ethanol with 20 wt.% of sodium ethylate with a velocity of 5,100 parts/-hour were fed into the reactor. The reaction mixture was withdrawn from the first reactor and continuously introduced into the second reactor, from which the reaction product was withdrawn in such a manner that the content of the two reaction vessels practically remained constant. The mixture was well stirred in each reaction container and kept at about 65°C by exterior cooling. The separation of the sodium chloride and the distillative working-up of the reaction mixture was carried out as described in EXAMPLE 1.

590 parts of orthoformic acid ethyl ester/hour were withdrawn from the column, which corresponded to a theoretical yield of about 79%. The boiling point of the orthoformic acid ester was at 146°C.

It is to be further understood that the examples given are merely illustrative and that various modifications and applications may be made without departing from the spirit and scope of the invention as set forth in the appended claims.

What is claimed is:

1. A process for the continuous production of orthoformic acid trimethyl or triethyl ester comprising:

a. simultaneously and continuously introducing a stoichiometric amount of an alkali metal ethylate or alkali metal methylate and chloroform into a reaction zone, said alkali metal methylate of alkali metal ethylate being introduced in the form of a solution with methanol or ethanol;

b. contacting said methylate or ethylate with said chloroform under conditions of agitation whereby the mixture is stirred at a rate of between 100 and 1,000 rpm in the absence of water and the exclusion of oxygen, at a temperature of from 60° to 100°C and at a pressure of from about 1 to 8 atmospheres;

c. withdrawing the reaction mixtures from said reaction zone; passing the reaction products to at least one additional zone also maintained at a temperature of from 60° to 100°C; and d. continuously separating under anhydrous conditions the alkali metal chloride formed in the reaction.

2. The method of claim 1 wherein the reaction solution after the separation of the alkali chloride contains up to 5% chloroform.

3. The method of claim 2 wherein the reaction solution contains from about 0.5 to 2% chloroform.

4. The method of claim 1 wherein the alkali metal ethylate or methylate is a sodium or potassium ethylate or methylate.

* * * * *